United States Patent
Gadiyaram et al.

(10) Patent No.: US 11,356,332 B1
(45) Date of Patent: Jun. 7, 2022

(54) METHOD AND SYSTEM FOR MONITORING A NETWORK RESOURCE

(71) Applicant: CyberCube Analytics Inc., San Francisco, CA (US)

(72) Inventors: Ramya Gadiyaram, San Francisco, CA (US); Sudhakar Birapaneni, San Francisco, CA (US); Mohammad Al Boni, San Francisco, CA (US); Harry Metzger, San Francisco, CA (US); Ajay Garg, San Francisco, CA (US); Pascal Millaire, San Francisco, CA (US)

(73) Assignee: CYBERCUBE ANALYTICS INC., San Francisco, CA (US)

( * ) Notice: Subject to any disclaimer, the term of this patent is extended or adjusted under 35 U.S.C. 154(b) by 0 days.

(21) Appl. No.: 16/866,237

(22) Filed: May 4, 2020

(51) Int. Cl.
  *G06F 15/173* (2006.01)
  *H04L 41/14* (2022.01)
  *H04L 41/28* (2022.01)
  *H04L 41/046* (2022.01)

(52) U.S. Cl.
  CPC ............ *H04L 41/14* (2013.01); *H04L 41/046* (2013.01); *H04L 41/28* (2013.01)

(58) Field of Classification Search
  CPC ........ H04L 41/14; H04L 41/046; H04L 41/28
  USPC ........................................................ 709/224
  See application file for complete search history.

(56) References Cited

U.S. PATENT DOCUMENTS

| | | | |
|---|---|---|---|
| 2014/0052864 A1* | 2/2014 | Van Der Linden | H04L 47/70 709/226 |
| 2014/0304399 A1* | 10/2014 | Chaudhary | H04L 41/5009 709/224 |
| 2017/0250892 A1* | 8/2017 | Cooper | G06F 21/552 |
| 2019/0116084 A1* | 4/2019 | Borah | H04L 41/5009 |
| 2020/0242019 A1* | 7/2020 | Rodrigues | H04L 43/50 |
| 2020/0366637 A1* | 11/2020 | Dhanabalan | H04L 61/2007 |

* cited by examiner

*Primary Examiner* — Alan S Chou
(74) *Attorney, Agent, or Firm* — Procopio, Cory, Hargreaves & Savitch LLP

(57) ABSTRACT

A method and system are disclosed which measure the functionality of a network services provider to determine its likelihood of failure. The method and system enable a point of failure to be identified and isolated by using a successive scoring system which looks at a network services provider at a resource, functionality and overall provider level.

18 Claims, 9 Drawing Sheets

METHOD AND SYSTEM FOR MONITORING A NETWORK RESOURCE

FIELD

The present disclosure relates to a computer-implemented method and/or a system for monitoring the operation of one or more computing resources that are associated with a communication network. Particularly, but not exclusively, the present disclosure relates to a method and/or system which can be used to identify a fault in, or an anomaly associated with the operation of a network resource such as, for example, a cloud computing resource.

BACKGROUND

As more and more of our lives, both personally and commercially, depend on information technology and the internet, we have become increasingly vulnerable to cyber-attacks and increasingly aware of cyber risk. Indeed, between 2013 and 2020, cyber risk catapulted from being the #15 most important risk for enterprise insurance buyers to the #1 most important risk for enterprise insurance buyers. Cyber risk has now surpassed the traditional property risks such as losses from building fires or mass losses from natural catastrophic events.

However, whilst cyber-risk is now acknowledged as being a priority, it still does not make it any easier to identify whether interruption to a business is due to the cloud services (or other computer systems) they are utilising or some other problem within that business.

As an example, if we take the insurance market, in order to provide about 100 times the capital available in the reinsurance market for such events, insurance linked securities could provide to cover business interruption due to the downtime of critical internet infrastructure through access to the capital markets. Insurance linked securities provide a way for companies to buy protection against the risk of incurring a loss as a result of a catastrophic event. However, there is no available solution to provide robust, auditable, reliable measurement of downtime, i.e. inactive or non-operational or a failure state, of cloud infrastructure providers, where downtime could be measured by the amount of time the resources provided are not functioning. Turning to the example of the insurance market again, such measurements could be used to create a parametric insurance-linked security for capital markets participants. Capital markets participants, such as, for example, organisations who sell the protection offered by insurance linked securities would need a technological solution with a high degree of confidence in in order to deploy hundreds of millions or billions of dollars of capital behind such a measure that is not reliant on existing cloud or service provider systems, such as technology vendors (e.g., AWS, Microsoft Azure) that provide Software as a Service (SaaS) and/or Platform as a Service (PaaS) and/or Functionality as a Service (FaaS) etc. to collect measurement information for which one would need to measure failure. This necessitates new processes and technologies for monitoring network resources.

Current monitoring techniques rely on the uptime statistics provided by the vendor themselves, which created perverse incentives for them inaccurately report downtime. Alternatively, a third party monitoring service may be to prove uptime, i.e. the availability or operation of a given resource. However the measurement errors in such a use case are insufficient. The level of specificity and the confidence required to make such a measurement for capital markets providers requires unique processes and applications of technology not undertaken to-date.

Currently, in order to assess availability of a cloud based service, existing techniques include (i) infrastructure monitoring, (ii) natural catastrophe parametric triggers or (iii) index based measures, which may be specific to an application such as cyber insurance linked securities or the like.

Infrastructure monitoring tools check user and vendor defined metrics of a service to determine the availability of that service. Typically, these include passive checks (ping, traceroutes, port monitoring, etc), alerting mechanisms (email, phone, chat), and historical data.

For natural catastrophes, third party services may be used to monitor natural events that can cause losses, i.e. natural catastrophe parametric triggers. For example, the United States Geological Survey (USGS) is a scientific agency of the United States government. The scientists of the USGS study the landscape of the United States, its natural resources, and the natural hazards that threaten it. Using Richter scale measurements, this provides for an object source that can be used by for example capital markets and reinsurers to create insurance catastrophe bonds, in a way that is not available to the cyber space.

Where index-based securities are deployed, indices rely on the self-reporting of losses. The challenge with this method is that it is unreliable. In practice, this means that for the insurance industry it can take several years until all claims are submitted from a cyber event and therefore a cyber insurance linked security can be paid out.

Aspects and embodiments were conceived with the foregoing in mind

SUMMARY

Viewed from a first aspect, there is provided a computer-implemented method of determining the likelihood of a fault in a service provided by a network provider. The network provider may be a computer-implemented resource that provides a plurality of types of network functionality using a plurality of network resources. The method of the first aspect comprises the steps of, for each network resource providing a designated type of functionality: assigning a plurality of agents to monitor the designated type of functionality, wherein each agent is configured to determine a measurement indicative of the performance of the type of functionality by the resource. The method includes combining the measurement determined by each agent to determine a first performance score, wherein the first performance score is indicative of the performance of the type of functionality provided by the respective network resource. Then, for each type of functionality, the method of the first aspect further includes the step of combining the first performance score with the respective first performance score determined for each of the other network resources also providing the designated type of functionality. The method then uses the combination of the first performance scores to determine a second performance score, wherein the second performance score is indicative of the performance of the type of functionality by the network provider. Each of the second performance scores are then used to determine a third performance score indicative of the performance of the network provider. The third performance score is used to indicate the likelihood of fault in the service provided by the network provider. Viewed from a second aspect, there is provided a system configured to determine the likelihood of a fault in a service provided by a network provider which may provide a plurality of types of network functionality using a plurality of network resources. The system comprising: a plurality of agents configured to monitor a designated type of functionality out of the plurality of types of network functionality. Each agent is configured to determine a measurement indicative of the performance of the type of functionality by a network resource. The system further comprises a resource tracker corresponding to each agent in the plurality of agents, the resource tracker configured to combine the measurement determined by each agent to determine a first performance score, wherein the first performance score is indicative of the performance of the type of functionality by the respective network resource. The system configured to, for each type of functionality, combine the first performance score with the respective first performance score determined for each of the other network resources also providing the designated type of functionality, wherein each performance score is assigned a weighting. The system then uses the weighted combination of the first performance scores to determine a second performance score, wherein the second performance score is indicative of the performance of the type of functionality by the network provider; wherein the system is further configured to use each of the second performance to determine a third performance score indicative of the performance of the network provider. The system then uses the third performance score to indicate the likelihood of fault in the service provided by the network provider.

A method and/or system in accordance with the first and second aspects advantageously enables the likely occurrence of a fault in the functionality provided by a network provider to be determined. The method utilises a plurality of agents to monitor a type of functionality associated with a network provider by monitoring a network resource, e.g. a server, to determine how well it is performing the functionality.

The use of a plurality of agents to monitor a type of functionality means that the system and/or method in accordance with the first and second aspects enables the functionality provided by a network provider to be accurately monitored and faults to be precisely identified. This is because the readings taken by each agent can be advantageously stored and used to trace back any faults which may have caused a network services provider to have undergone downtime.

Advantageously, in using a plurality of agents, the measurements relating to each the type of functionality are more reliable, auditable and objective. This also increase the integrity of the assessment of the functionality of the network resource if a fault does occur. This is because using a plurality of agents to measure the same type of functionality provides a higher likelihood that the resulting measurement is statistically reliable as a measurement provided by one agent could be down to noise, network faults and other obstacles whereas the same measurement taken by two or more distinct agents is not likely to be subject to the same statistical uncertainty.

That is to say, a method, system or device in accordance with the first and/or second aspect provides an indicator of the performance of the network which is more reliable as the measurements can be used to isolate the specific source of the downtime of a network service provider and the measurements are not polluted by "noise" which can result from network failures, infrastructure failures and hardware failures.

A method and system in accordance with the first and/or second aspects also provides improved auditability as it is not dependent on a particular hardware or network configuration. A method and system in accordance with the first and/or second aspects also provides objectivity as the measurements may be taken by agents which are not maintained by the network service providers themselves and are therefore not being influenced by those providers. Similarly, an increase in integrity can be provided as the measurements of the performance of the functionality are not gamed by the provider.

Examples of the functionality which may be monitored by an agent in accordance with the first and/or second aspects include infrastructure, application and network.

In order to monitor infrastructure functionality, an agent may issue a request to a resource to instantiate a new resource such as, for example, a server and then measure the number of successful instantiations of the resource over a time period or the time taken to successfully instantiate the resource.

Monitoring of application functionality by an agent may, for example, comprise an agent issuing a request to upload a file of a fixed size and then measuring the time taken for a successful upload. The successful functionality of the resource may be measured as a ratio of the number of successful attempts in a time period or the time taken for a successful upload of a file. The size of the file can be configured.

Network functionality may be measured by an agent which is configured to issue a ping and/or a trace route request and then measuring the number of times successful connectivity is achieved over a fixed time period.

The time period in any instance can be adjusted, as can the frequency of the request that is issued by the agent.

A network provider may be any provider of services which includes hardware and/or software based services or functionality to enable processes or protocols responsible for network connectivity, communications, operations and management of a network or computing resource. A specific example of a network or computing resource may be an enterprise network including hardware such as, for example, routers, switches, local area network (LAN) cards, wireless routers and cable. An enterprise network may also include software such as, for example, networking operations and management software, operating systems, firewalls, network security software and network services such as, for example, T-1 line, DSL, satellite, wireless protocol and IP addressing. A network provider also includes providers of cloud computing services such as cloud networking, cloud infrastructure and cloud application. Cloud infrastructure is understood to provide configurable virtual processing, configurable virtual storage and networking fabric resources and includes virtual servers, virtual computers, virtual network switches, virtual hubs, virtual routers, virtual memory and virtual storage. Cloud networking generally provides hosting and usage of servers for all network resources and services such as virtual routers, bandwidth, virtual firewalls and network management software. Cloud application is taken to include any or all of the processing and storage involved in the running of an application through a cloud service.

An agent in accordance with the first and/or second aspects is configured to execute a program which causes requests to be issued to a network resource for the execution of a defined task and for the response from the network resource to be measured. The agents may be implemented as bots, neural networks, sensors or tracking units.

Each agent is configured to store their measurements of the performance of the function type associated with the network resource in memory or in storage. The storage may be local to the agent or it may be located remotely to the agent or in the cloud.

The network resources could be any resource which is suitable for providing the respective type of functionality such as, for example, servers, routers, firewalls, storage and the virtual equivalents of each, The agents record a measurement which indicates the performance of the network provider in providing the functionality and this measurement is used to generate a score which is indicative of how the resource is performing the functionality. Advantageously, in using a plurality of agents, the measurement is firstly more reliable, as it is not likely all of the agents will by polluted by the same noise from failures in network and hardware. Secondly, the measurement is advantageously more objective as it can provide a more complete picture when auditing takes place as one agent can be used to verify another, and also objective as the measurement need not be provided only by the providers own services. Advantageously, the agents may be distributed across large geographic areas to provide a footprint to ensure that the resources being monitored will not be erroneously identified to have an outage due to localised issues.

Each measurement taken by an agent may be weighted based on some operational significance such as, for example, its known or expected reliability or its locality relative to the resource.

In weighting the measurements taken by agents based on operational significance, the measurements can be effectively scaled to reflect how reliable we expect they are. In a specific (but non-limiting) example, one agent may be physically located inside a resource and another agent may be located remotely relative to the resource. The agent physically located inside the resource may be given a lower weight as it is possible the resource may influence the measurements taken by the agent and reduce the objectivity of the measurement. The agent located remotely relative to the resource is likely to be more influenced by network or infrastructure issues when taking a measurement and also given a lower weight. However, another agent which is located closer to the resource may be given a higher weighting as it is less likely to suffer from as much statistical uncertainty in its measurements as the agent which is located further away. Another agent may be assigned a different weighting again as the telecommunications network nearby may comprise a larger number of components which are more likely to influence the measurement taken by the agent than a measurement which is delivered to an agent where fewer network components are utilised.

The effect of this is that the measurement taken by each agent in the determination of the first performance score may be weighted according to the respective function provided by the network provider or the service provided by the provider. For instance, this may be based on at least one of a level of importance or priority associated with the respective function. This importance or priority is likely to vary depending on the application or purpose of the respective function. Herein after, simply for ease of reference such level of importance or priority of a function or its operations will be referred to as a criticality, but this is by no means to be taken as a reference to this feature being always essential or critical to network provider.

This criteria may be applied to all of the agents being used in the monitoring of a network provider as this will ensure consistency in the measurements and eventual consistency in the output if a fault occurs. The weighting may be tweaked by the network provider or by another user of the method or system. That is to say, agents monitoring resources providing functions which are deemed to be of high importance may be weighted higher than agents monitoring resources providing functions which are deemed to be of lower importance.

That is to say, the weighting assigned to an agent may be based on a combination of location and importance of the functionality delivered.

Each agent monitoring a type of functionality provided by a network provider may be configured to collect the same measurement as the other agents monitoring the same type of functionality provided by the network provider. This ensures the same calculation/measurement of performance is used by each agent to monitor that type of functionality and therefore that calculations of the performance of that type of functionality cannot be undermined by a lack of consistency.

That is to say, a compensating factor can be used to scale the measurement determined by an agent. The compensating factor can be determined by routine experimentation and adjusted over time based on the operation of the agent and how well it generally indicates the performance of the resource. That is to say, if a first agent is typically expected to be correct 20% of the time, then a weighting of 0.2 can be applied to its measurement and a weighting of 0.7 can be applied to the other agent if it is considered to be correct 70% of the time. The weighting may be determined by other operational factors such as the amount of noise in a certain location which may influence the measurement, the distance between the agent and the network resource, i.e. to accommodate for the number of network points the signalling would need to traverse, or the anticipation of regular interruptions in the network if the agent is positioned in a space in which interruption is frequent.

The agents may be distinct agents which utilise different network, hardware and component configurations to take measurements regarding the performance of resources. Advantageously, the use of different network, hardware and component configurations enhances the performance of the method and/or system as the measurements are made more reliable due to the weighting given to the measurements taken from the agents.

Advantageously, a method and/or system in accordance with the first and second aspects can be scaled up easily as more and more resources are added to a network service provider.

The measurement may be repeated for each resource which is providing the same type of functionality to provide a second score for that functionality. The contributions to the second score may also be weighted based on similar considerations to the weighting given to the measurements. The combination of scores for the respective types of functionality can then be combined to indicate the overall performance of the network provider.

The first performance score, the second performance score and the third performance score may be stored using any suitable storage medium either, locally, remotely or in the cloud. As the first performance score is indicative of the performance of a network resource, the second performance score is indicative of the performance of the type of functionality and the third performance score is indicative of the performance of the network provider. Storing these scores means that when a point of failure occurs the point of failure can be identified and isolated.

The first performance score for each network resource is used to generate the second performance score for the type of functionality provided by the provider. This second performance score which indicates the performance of the type of functionality provided by the provider is used to generate the third performance score which indicates the performance of the provider. Advantageously, this means that where a fault occurs which may, for instance, be indicated by the third performance score being below a specific threshold, a user of a method and/or system in accordance with the first aspect can trace back from the third performance score to which of the second performance scores is low—which enables the type of functionality which is underperforming to be isolated. The second performance score corresponding to the type of functionality which is underperforming can then be traced back using the first performance scores to delineate the underperforming resource. Additionally, the system may be configured to traverse the storage of the first performance score, the second performance score and the third performance score with an appropriately configured network outage identifier module to identify the source of the outage by tracing back through the values to identify the resource which is not properly functioning.

The determination of scores corresponding to performance of the individual network resources, the performance of the types of functionality and the overall performance of the network provider means that advantageously, the source of a fault is easier to identify as it is possible to look at the performance data in a granular fashion whereby the resources can be scrutinised individually and the scores are more reliable as they have been determined by multiple agents.

The plurality of agents may comprise both an internal agent and an external agent. An internal agent may be an agent which is managed by the provider themselves or an agent which is physically located inside a resource but is managed by an external provider. An external agent may be an agent which is maintained externally to the resource. Advantageously, in using both internal and external agents, the reliability of the scores is improved as both agents are not likely to be influenced by the other working of the resource or, indeed, by the provider themselves. An external agent is also less likely to be influenced by the same noise when taking measurements as the internal agent, where "noise" describes the statistical uncertainty within a telecommunications network. The statistical uncertainty may be contributed by the noise, which is inherent in a telecommunications network, but it may also be due to the differing reliability of the components and hardware which make up the telecommunications network. Optionally, the internal agent and external agent may both be independent of the network resource and therefore not influenced by it at all.

Using the second performance scores to determine a third performance score indicative of the performance of the network provider may comprise using a suitable configured computer to determine a second performance score for a designated type of functionality. The suitably configured computer may also be configured to compare the second performance score with a monitoring threshold for the designated type of functionality; and based on the comparison, outputting a third performance score indicative of the performance of the network provider.

The advantageous effect of this is that a particular type of functionality can be given more prominence in the determination of the performance of the network provider. This means that a type of functionality which may be more important for one or more scenarios, such as infrastructure, can be used to scale the measurements. As a type of functionality, infrastructure may be more important than, say, application or network as without infrastructure the other two are useless in the provision of service by the service provider. That is to say, if the score assigned to infrastructure is below a specified threshold, the score assigned to the provider can be assigned as zero to indicate complete failure on the part of the network provider.

The measurement indicative of the performance of the type of functionality by the resource may be repeated after the expiry of a time interval. The time interval may be adjustable. An example time-interval may be one minute or ten minutes. Other periods are also envisaged, and the disclosure is not considered to be so limited.

In repeating the measurement at frequent intervals, the availability of the network provider is tracked over a period of time and can therefore be examined over a period of time. The interval may be adjusted so that the measurements of the type of functionality are repeated every second, say, or every 10 minutes. This means that failures can be determined based on the time they occurred and the corresponding failed component can then be identified by the system which may be configured to traverse through the stored first, second and third performance scores to isolate the source of failure and the time instance of failure can be approximated.

The operational significance of the agent may be based on geographic location. The effect of this is that agent may be given weighting which is low if the agent is based further away from the monitored resource or high if the agent is based closer to the monitored resource.

The network provider may be a cloud service provider such as, for example Amazon Web Services or Microsoft Azure®. The effect of this is that advantageously, the method and/or system can be used to determine the occurrence of fault in the services provided by a cloud provider and can be used to assess the cyber risk associated with a cloud service provider. The plurality of types of functionality which are monitored may be selected from cloud network, cloud infrastructure and cloud service.

The first performance score, second performance score and third performance score may be stored in distributed storage across multiple locations. Advantageously, the effect of this is that the performance scores can be accessed if a determination needs to be made about a failure but also that the data is stored across multiple locations.

DESCRIPTION

An embodiment will now be described, by way of example only and with reference to the following drawings in which.

Figure 2A:
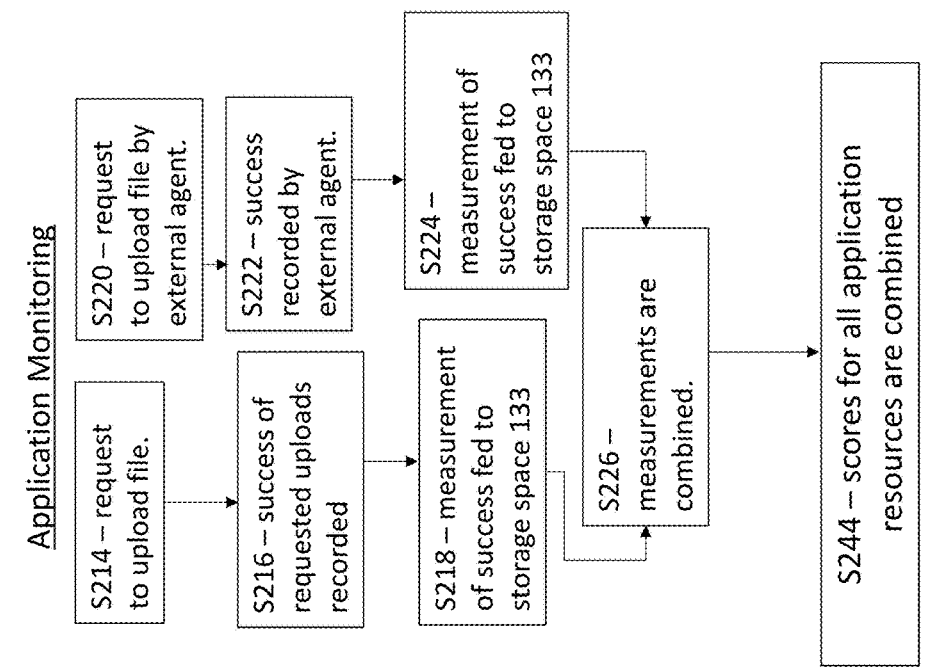
FIGS. 2a and 2b are flow charts illustrating the determination of the performance of a type of functionality by a resource.
Figure 2B:
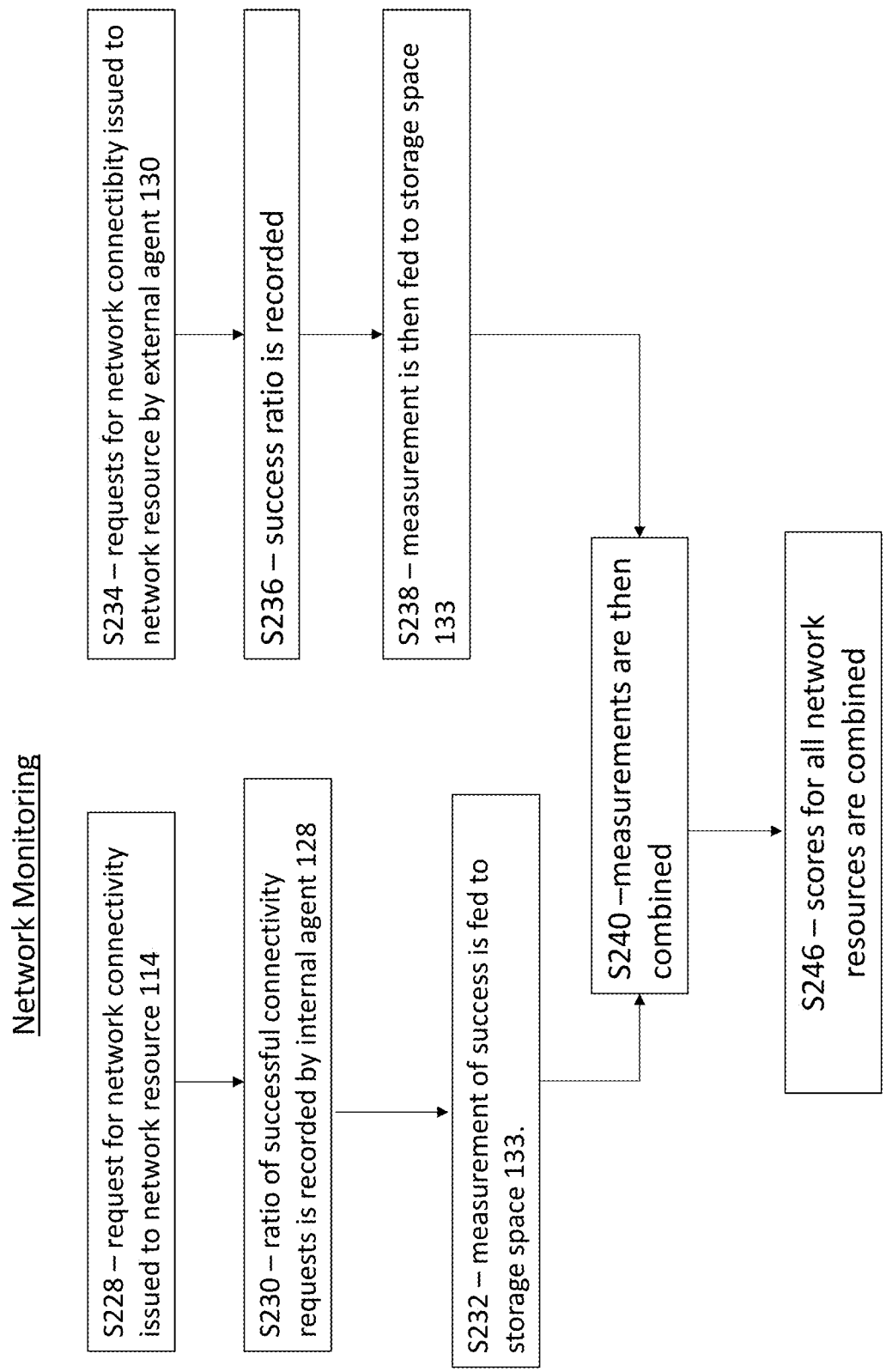
Figure 2C:
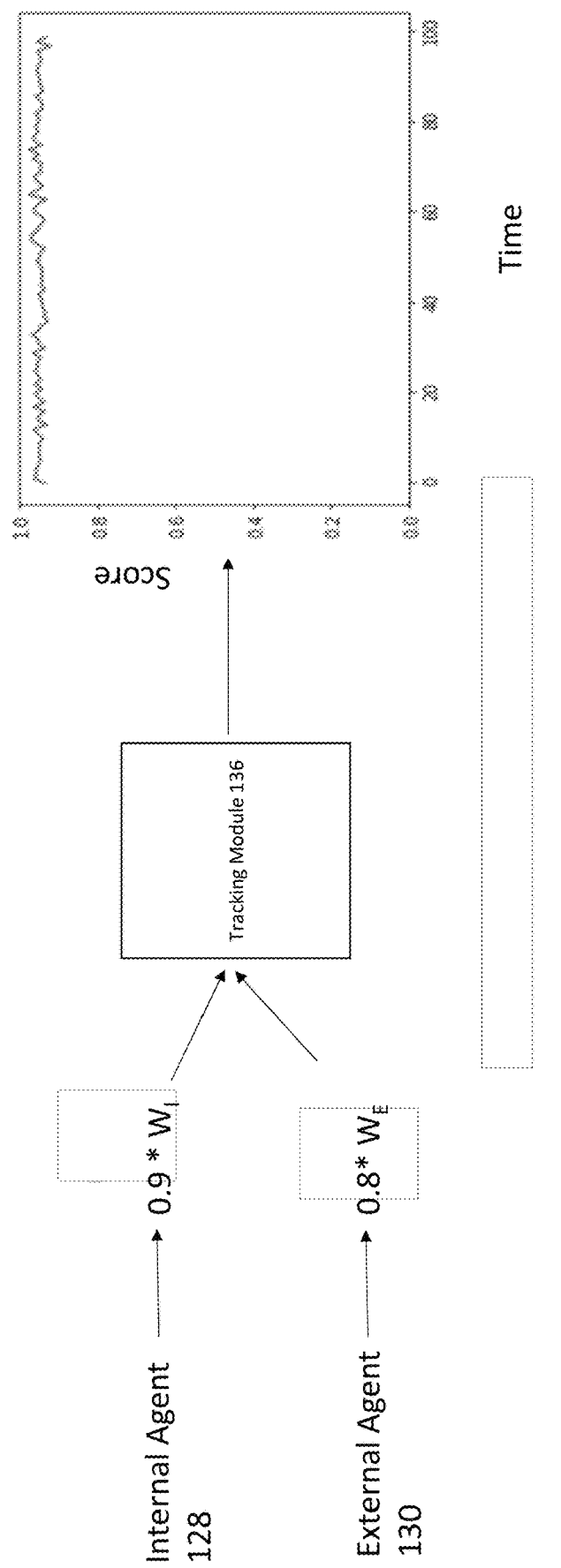
Figure 3:
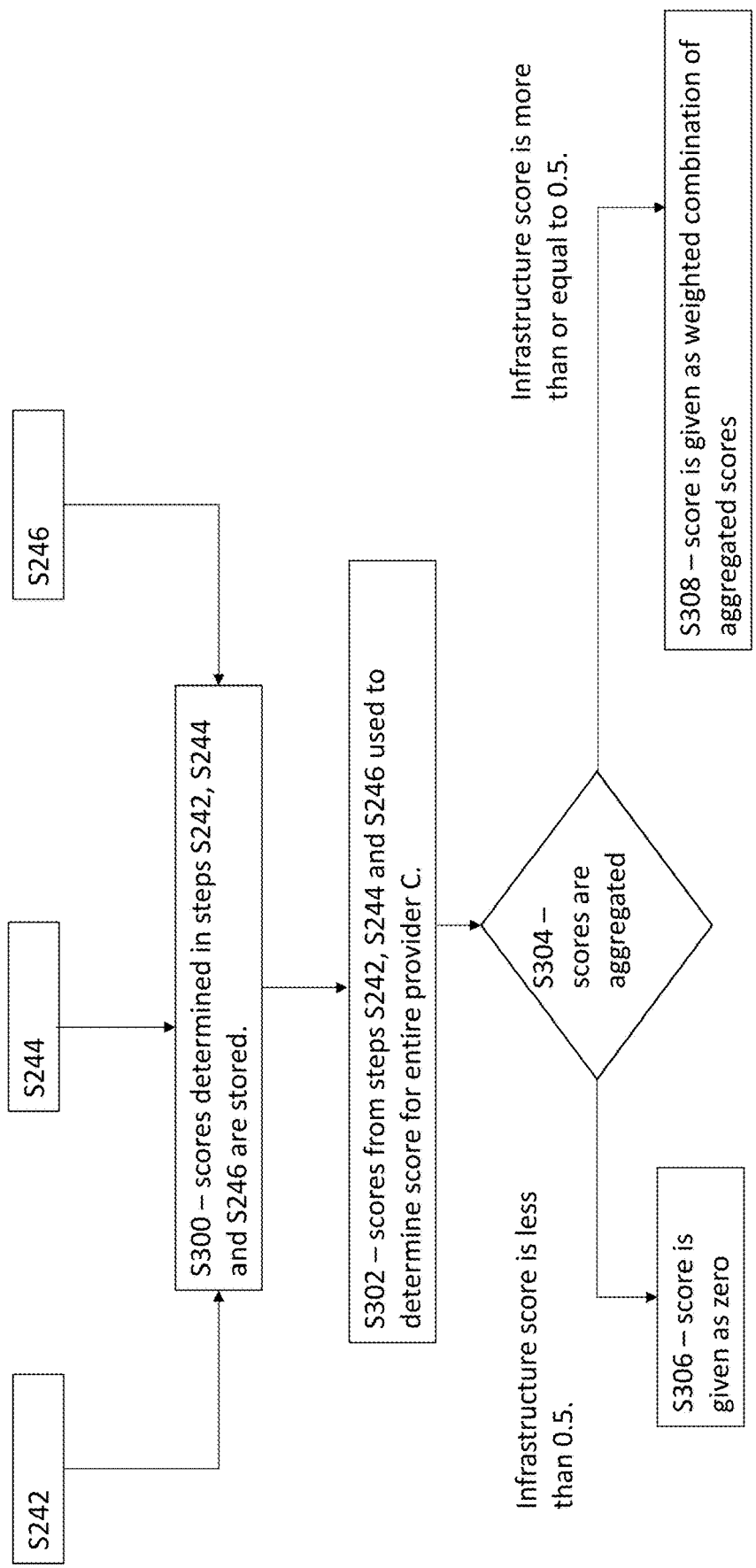
Figure 4A:
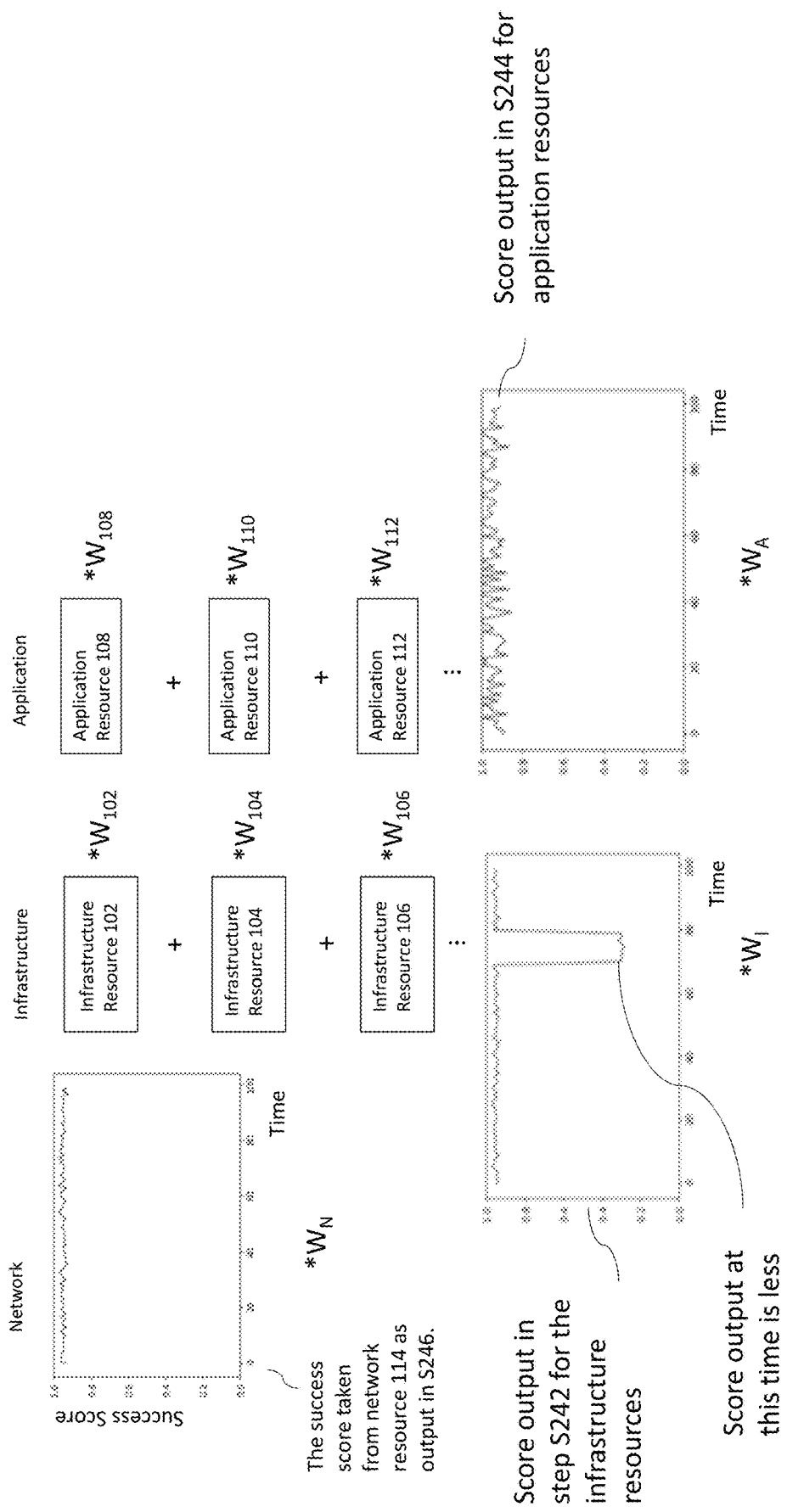
Figure 4B:
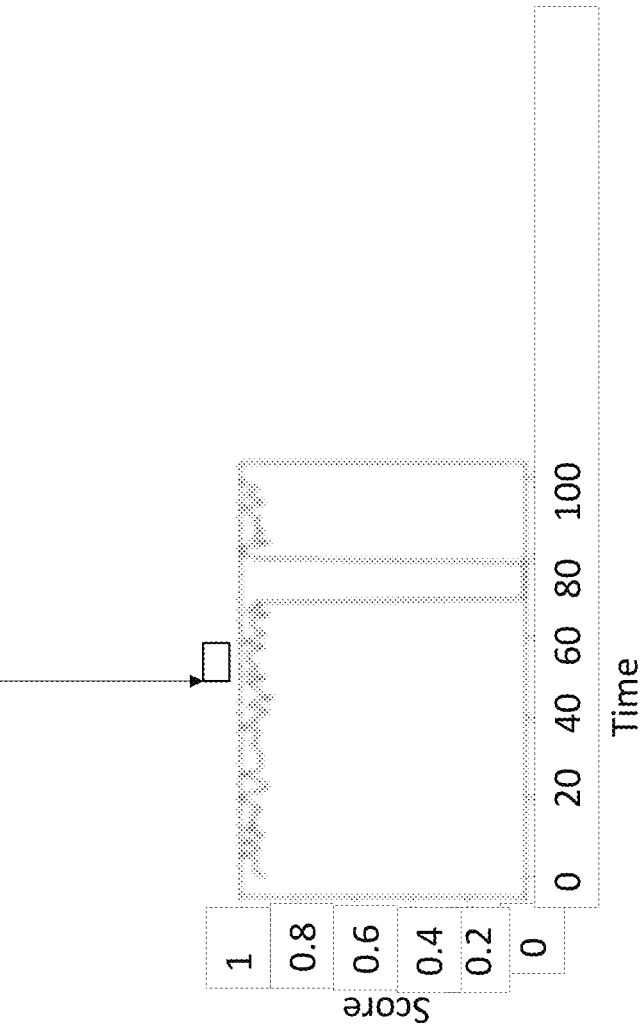
Figure 5:
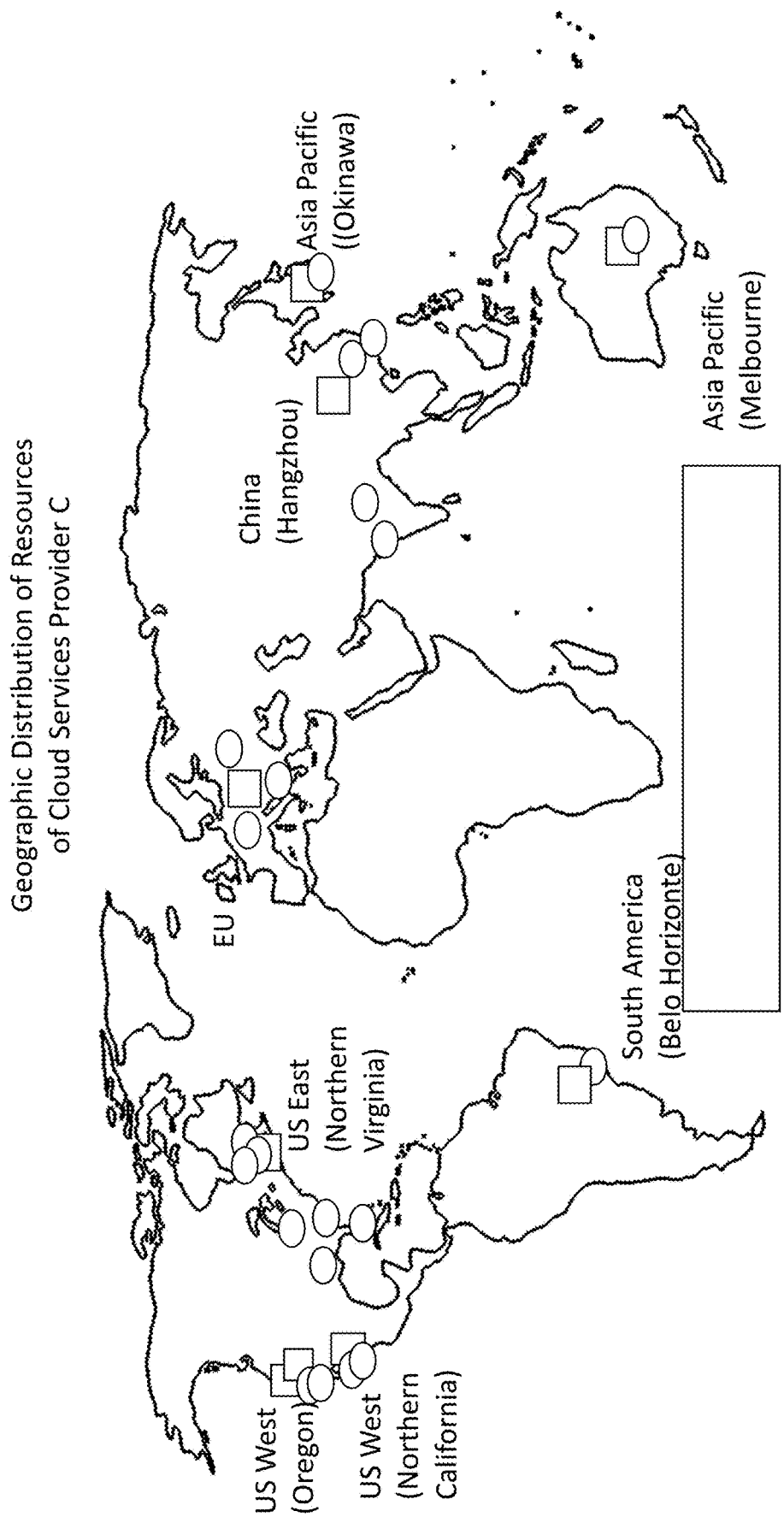

FIG. 2c schematically illustrates how a success score for a resource is determined;

FIG. 3 is a flow chart illustrating the determination of the performance of a type of functionality by a plurality of resources;

FIGS. 4a and 4b illustrate the determination of the performance of a network provider; and FIG. 5 illustrates the geographic distribution of the resources of a cloud services provider C.

Figure 1A:
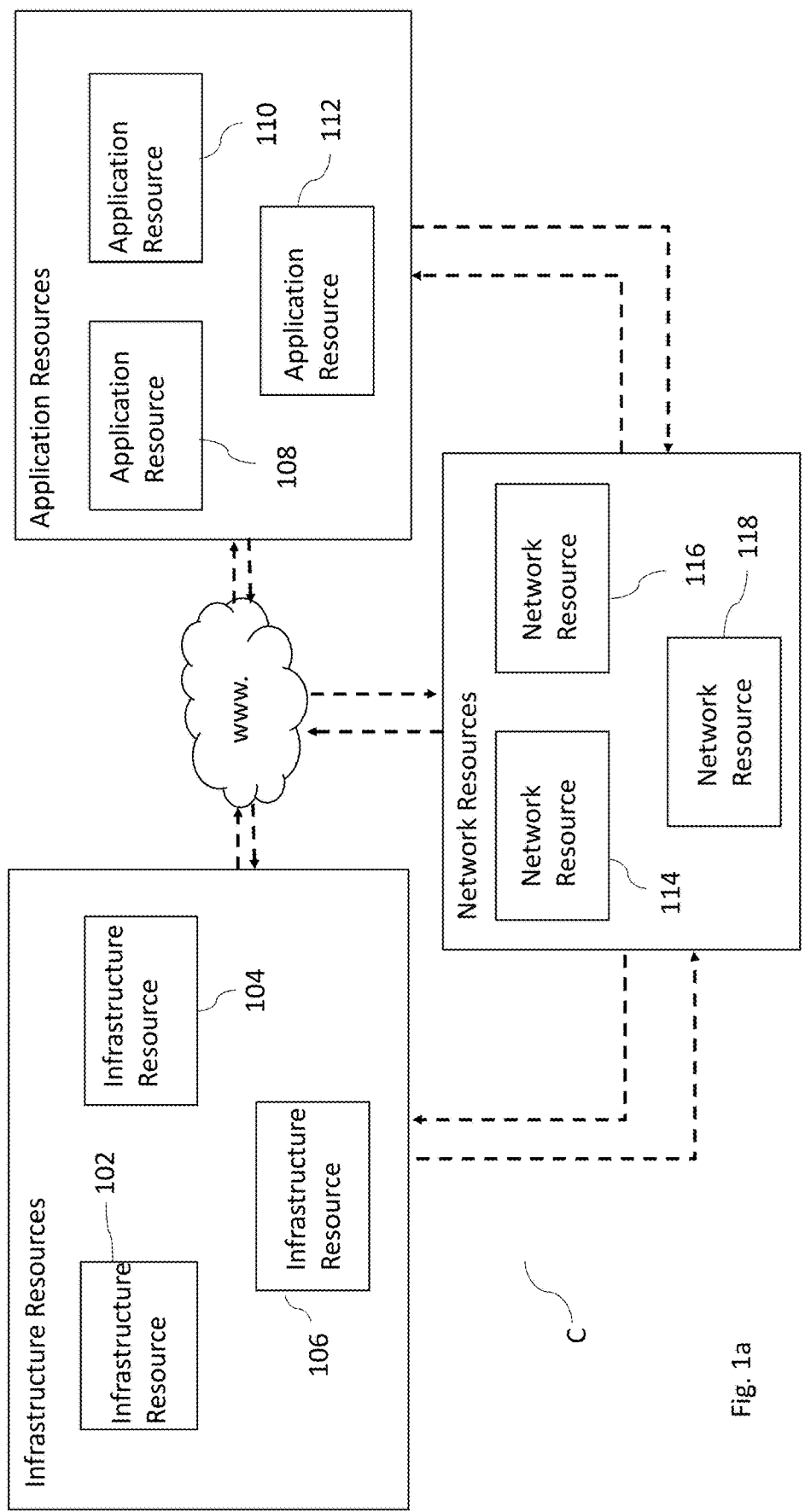
FIG. 1a is an illustration of a cloud service provider which is monitored by a system in accordance with the embodiment.
Figure 1B:
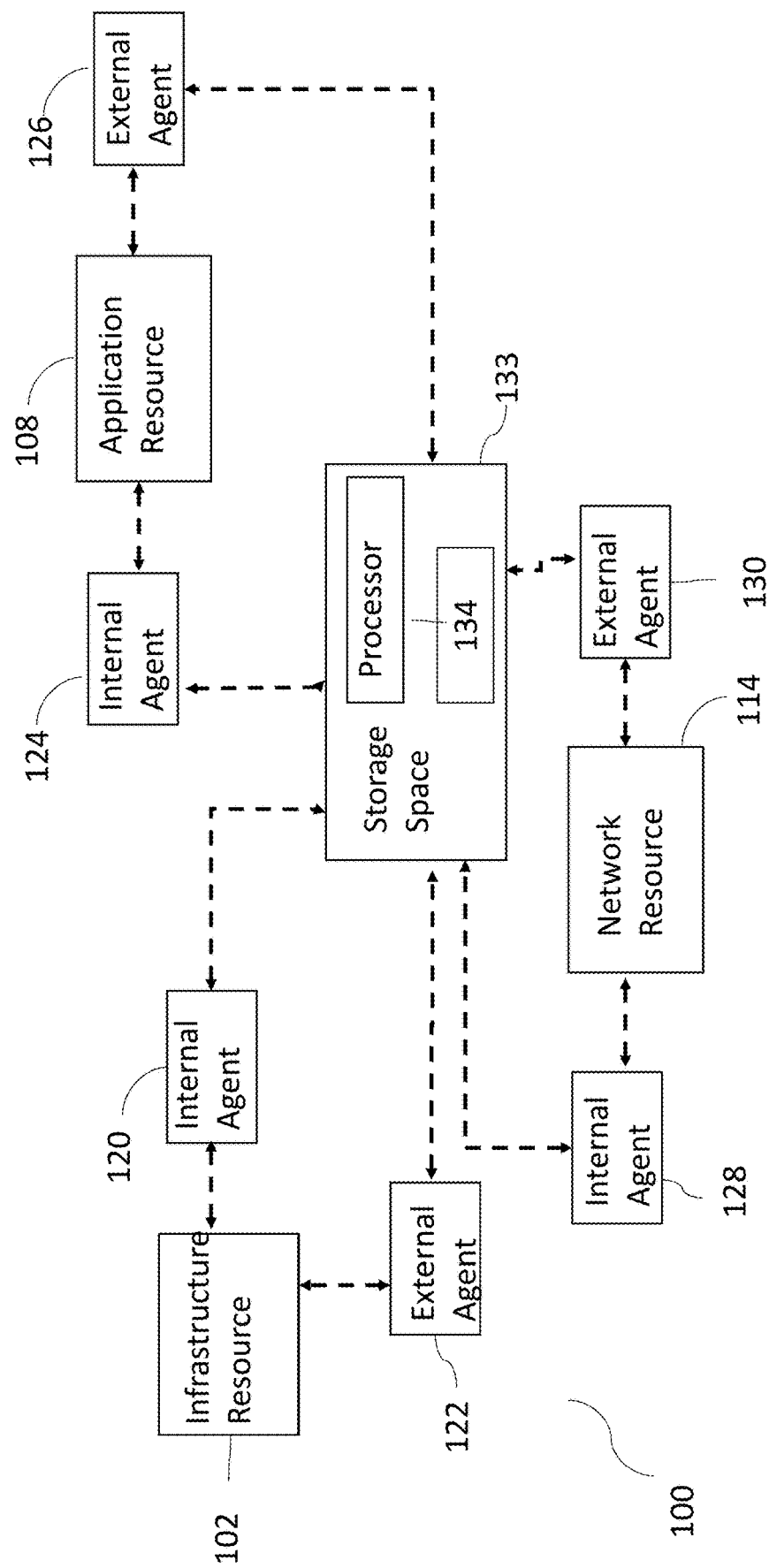
FIG. 1b is an illustration of agents which monitor the functionality provider by a cloud service provider.

We now illustrate, with reference to FIGS. 1a and 1b, a configuration of a system 100 in accordance with the embodiment which is used to monitor a cloud services provider (C).

Starting with FIG. 1a, cloud services provider C provides infrastructure resources 102, 104 and 106, application resources 108, 110 and 112 and network resources 114, 116 and 118 to service users. Although the system 100 is described in respect of a specific number of resources, it will be appreciated that this is an example only and that smaller or larger numbers of resources could be provided by the cloud service provider. Each of the resources can communicate with each other over the world wide web or another suitable network. That is to say, each of the resources may be located in a single piece of hardware or they may be distributed over a wider area, whether that be within the same city, country or continent.

Infrastructure resources 102, 104 and 106 are used by the provider to provide server capacity to a service user. Server capacity provided by any of infrastructure resources 102, 104 and 106 may be used by a service provider to handle their web traffic or to provide backend services for their IT infrastructure. Examples of service users may be an investment bank who use the server to process transactions or perform high-powered computing. Alternatively or additionally, another service user may be a large manufacturer with several locations who use the server capacity offered by infrastructure resources 102, 104 and 106 to manage their manufacturing locations.

Infrastructure resources 102, 104 and 106 which may be monitored by system 100 are not limited to those which provide server capacity to a user of provider C. Indeed, infrastructure resources may also provide other forms of cloud infrastructure such as, for example, virtual machines and virtual components such as servers, memory, network switching, firewalls, load balancing and storage.

Application resources 108, 110 and 112 are used by the provider C to provide processing capacity to a service user. Processing capacity provided by any of application resources 108, 110 and 112 may be used by a provider of an application to handle the processing for the use of one of their applications or an aspect of the processing of one of their applications. Examples of service users may be providers of Software-as-a-Service (SaaS) who will run their software through at least one of the application resources 108, 110 and 112. Another example may be a provider of Mobility as a Service (MaaS) who use the processing capacity offered by application resources 108, 110 and 112 to track the location of each of their vehicles, which would feed its position data to the application resource over the world-wide web or another suitable network. Users of an application resource such as one of application resources 108, 110 or 112 may also typically use the application resource as a destination for data they wished to be processed by the application resource. An example application which may be run (or at least partly run) through one of application resources 108, 110 or 112 may be a local device which runs a browser where the user interacts with the application through the browser, e.g. DropBox. Another example application which may be run through one of application resources 108, 110 or 112 may be where the local device runs a browser which downloads a browser-based application when the application is initiated, e.g. Google Docs. A further example application which may utilise an application resource 108, 110 or 112 may be where the local device runs the application itself but uses application programming interfaces (APIs) to send data to the application resource and receive data from the application resource.

Network resources 114, 116 and 118 are used by the provider to provide network resources to a service user. These resources may provide virtual router capacity to a service user which may be used to route traffic around their network. Examples of service users may be a large company with multiple locations who use the virtual router capacity to transmit traffic around their network if they do not have their own network hub. Example network services may be virtual routers, bandwidth or firewalls or even network management software. Network resources 114, 116 and 118 may enable both cloud-enabled networking and cloud based networking. Cloud-enabled networking means that whilst some hardware is physically hosted at a user's premises, the management, monitoring and security of that hardware is implemented through the respective network resource 114, 116 and 118. Cloud-based networking means that all of the hardware, its management, monitoring and security, is hosted at one of the respective network resource 114, 116 or 118.

For each resource, whether it be a network resource, infrastructure resource or application resource, the system 100 provides an internal agent and an external agent as illustrated in FIG. 1b. In FIG. 1b, we illustrate a single application resource, a single network resource and a single infrastructure resource but this for simplicity of illustration.

In describing the agents using the descriptor "internal" or "external" the agents are not intended to be limited to a particular location for the purposes of this example. However, it is within the scope of this description for an internal agent to be physically located within the respective resource at cloud services provider C and it may even be managed by that provider C. Alternatively or additionally, the internal agent may be physically located outside of that resource. Similarly, the external agent may be located anywhere in that it could too be located internally to the resource, but it could also be located externally to the resource.

Infrastructure resource 102 is monitored by internal agent 120 and external agent 122. Application resource 108 is monitored by internal agent 124 and external 126. Network resource 114 is monitored by internal agent 128 and external agent 130. Each of the internal agents and external agents is configured to feed data to a respective storage space 133. The respective agents interact with the storage space 133 over a suitably configured telecommunications network.

The respective resources in each case are monitored by distinct agents which are configured to interact with the respective resource using different hardware and network configurations. For example, an internal example which is located physically inside a resource will only be communicating with the resource using the local hardware. The external agent monitoring the same resource will be interacting with the resource through a telecommunications network alongside other data which is being transmitted over the respective network configuration.

The respective internal agent and external agent are configured as bots which execute a computer program which cause an appropriate request to be issued to the respective resource. Each agent may have its own local storage and processing which enables it to both store data and execute instructions provided by a software routine.

Storage space 133 provides a shared storage space for agents and other associated systems to communicate. This will be further described later.

The set up described in FIG. 1b provides an independent monitoring system for cloud service providers which is distributed and deployed to check all of the types of functionality provided by the service provider. Each of the resources will similarly be monitored by an internal and external agent and we will now describe how this configuration will be used to determine the availability of the cloud service provider in a way which is reliable, auditable, objective and which maintains integrity—and which enables a fault or failure in a cloud services provider such as C to be isolated and identified.

We will now describe how the configuration illustrated in FIG. 1b is used to track the availability of a resource which is part of a cloud service provider. This is described with reference to FIGS. 2a and 2b by way of non-limiting example only.

If we first consider the infrastructure resource 102, then in a step S200 the internal agent 120 is configured to issue a request to the infrastructure resource 102 to initialise a new virtual server resource and await a response from the infrastructure resource indicative of success, i.e. that the virtual server resource has been initialised. The recordal of a success is performed in step S202. This is repeated at a set frequency, say, 5 times a minute, and the number of successes and failures are counted by the internal agent 120 to determine a success rate which is measured as the number of successes/number of attempts. That is to say, if 5 attempts are made over the course of the time interval and only 3 result in successful instantiation of a new server resource then a success rate of ⅗ (0.6) will be recorded and used as a measurement of the performance of the infrastructure resource 102 by internal agent 120. The measurement is then fed to storage space 133 by the internal agent 120 in step S204. Internal agent 120 is not limited to requesting the instantiation of server resources and may use other parameters to measure the success of the infrastructure resource 102 including the measurement of round-trip time (RTT) for a request, the successful upload of files to the server and any other parameter which may be used to measure the operation of a server.

In step S206, the external agent 122 (distinct from internal agent 120) is configured to issue a request to the infrastructure resource 102 to initialise a new virtual server resource and await a response indicative of success, i.e. that the virtual server resource has been initialised. The recordal of a success is performed in step S208. This is, again, repeated at a set frequency, say, 5 times a minute and the number of successes and failures are counted by the external agent 122 to determine a success rate which is measured as the number of successes/number of attempts. That is to say, if 5 attempts are made over the course of the time interval and only 2 result in successful instantiation of a new server resource then a success rate of ⅖ (0.4) will be recorded and used as a measurement of the performance of the infrastructure resource 102 by external agent 122. The measurement is then fed to storage space 133 in step S210. Similar to internal agent 120, external agent may also measure other parameters indicative of a well-functioning server.

Storage space 133 comprises a processor 134 which is configured to draw from a library of software routines for analysis of the measurements received from the agents. The measurements provided by each agent are assigned a weight which is indicative of the operational significance of the respective agent. The measurement from internal agent 120 is given a weight ($W_I$) and the measurement from external agent 122 is given a weight ($W_E$) and they are combined by a tracking module 136 which sums the weighted measurement from each of the agents to provide an output score indicative of the performance of that network resource at the time. The output score can then be tracked over time to give an indication of the successful operation of the infrastructure resource 102. In this instance, $W_I$ is set equal to 0.7 and $W_E$ is set equal to 0.3 which means the success score is 0.7*0.6+ 0.3*0.4=0.54. This is calculated in step S212. That is to say, infrastructure resource 102 is given a score of 0.54 to indicate how well it is functioning at that instance in time. The measurements of steps S200 to S212 can then be repeated after expiry of a pre-determined time, interval, such as, for example, 10 minutes or even 1 minute. The measurements taken by each agent and the combined measurements can then be placed in storage for access later if necessary. The storage may be indexed in time so that the measurements at a specific instance in time can be mapped back to the measurements obtained by the agents.

If we now consider application resource 108, which is monitored by internal agent 124 and external agent 126, wherein the agents are again distinct. Internal agent 124 is configured to issue a request to application resource 108 to upload a file of a fixed size in a step S214. The size can be determined by the average size of files which are uploaded to the application resource but can also be smaller or larger dependent on the situation. Internal agent 124 is configured to maintain a record of the successful file uploads and record them in step S216 as a ratio of the number of successes/ number of attempts. That is to say, if 10 attempts are made over the course of a minute and only 6 are successful, then a score of 0.6 is recorded as an indication of the performance of the application resource 108. The measurement is then fed to storage space 133 in a step S218

Additionally, the internal agent 124 is configured to check the checksum of the uploaded file to ensure that read/write operations within the application resource are working correctly and the integrity of the read/write operations is being maintained. The internal agent 124 is also configured to maintain monitoring over the length of time required for a successful upload of a file.

External agent 126 is also configured to issue a request to application resource 108 to upload a file of a fixed size in a step S220. Again, the size of the file can be determined by the average size of the files which are uploaded to the application resource but can also be smaller or larger dependent on the situation. External agent 126 is then configured to maintain a record of the successful file uploads and record them in step S222 again as a ratio of the number of successes/number of attempts. That is to say, if 10 attempts are made over the course of a minute and only 7 are successful, then a score of 0.7 is recorded as an indication of the performance of the application resource 108. The measurement is then fed to storage space in a step S224. Similar to the internal agent 124, external agent can also carry out other checks to determine the successful functioning of the application resource 108.

The success score of the application resource 108 is then determined in a step S226 where the measurement provided by internal agent 124 is given a weighting ($W_I$) and the measurement provided by external agent 126 is given a weighting ($W_E$) by storage space 133. They are then fed into tracking module 136 which combines the scores to give a success score. That is to say, if internal agent 124 is given the weighting 0.8 and external agent 126 is given the weighting 0.4, the success score for application resource 108 is given as 0.6*0.8+0.7*0.4=0.76.

One other measure the application resource 108 may be scored on is the ratio of successful service-specific operations, e.g. storage enqueue/dequeue for a Queuing aspect of application resource 108.

The measurements of steps S214 to S226 can then be repeated after expiry of a pre-determined time, interval, such as, for example, 10 minutes or even 1 minute. The measurements taken by each agent and the combined measurements can then be placed in storage for access later if necessary. The storage may be indexed in time so that the measurements at a specific instance in time can be mapped back to the measurements obtained by the agents.

If we now consider network resource 114 which is monitored by internal agent 128 and external agent 130. Internal agent 128 is configured to monitor network resource 114 by measuring the response time from the network resource issuing a request for network connectivity to the network resource 114 in a step S228 and repeating this step at a fixed frequency, i.e. 10 times over the course of a minute. Specifically, the internal agent 128 will issue network ping requests and trace route requests and measure their success as the number of times connectivity is established/number of attempts in a step S230. That is to say, if 10 trace route requests are issued over the course of a minute and 9 are successful then a measurement of 9/10 (0.9) is transmitted to storage space 133 in a step S232.

Similarly, external agent 130 is also configured to issue network ping and trace route requests (or any other requests which establish connectivity) to the network resource 114 in a step S234 and measure success similarly as the number of times connectivity is established/number of attempts in a step S236. That is to say, if 10 trace route requests are issued over the course of a minute and 8 are successful then a measurement of 8/10 (0.8) is transmitted to storage space 133 in a step S238.

In some embodiments, the network resources may be checked first prior to checking application and infrastructure functionality to ensure connections can be established with the respective resources. In other embodiments, other types of functionality, such as infrastructure, may be checked first.

In step S240, the weighted combination of scores is calculated by tracking module 136 after the scores from the respective internal and external agents are assigned weights of respectively 0.7 for internal agent 128 and 0.3 for external agent 130. The success score for network resource 114 is then determined as 0.7*0.9+0.3*0.8=0.87 by tracking module 136.

The measurements of steps S228 to S240 can then be repeated after expiry of a pre-determined time, interval, such as, for example, 10 minutes or even 1 minute. The measurements taken by each agent and the combined measurements can then be placed in storage for access later if necessary. The storage may be indexed in time so that the measurements at a specific instance in time can be mapped back to the measurements obtained by the agents.

The weights assigned to each agent are determined by the operational significance of that agent. For example, an internal agent which is located closer to the respective resource than an external agent may be given a higher weighting as its measurements will likely be more reliable. The increased reliability will be due to a reduced chance that its measurements will be influenced by localised problems within the telecommunications network. However, an internal agent which is located within the resource may have a lower weighting as its measurements are more likely to be influenced by the cloud service provider. Similarly, an external agent which is located, say, on the East Coast of USA which is configured to monitor a resource on the West Coast may be given a lower weighting than a resource which is located in Nevada or Utah as they are closer and less likely to have their measurements influenced by problems in the network.

That is to say, the use of multiple distinct agents to monitor resources provides a more reliable, objective and auditable means by which the functionality of a cloud service provider C may be monitored. This is because the system uses measurements from multiple agents to determine the functionality of the particular resource and not just a single agent. The measurement and success score is then less dependent on the statistical uncertainty associated with a single agent and the hardware and network configuration which is used to both implement that agent and enable that agent to interact with the respective resource.

The measurement taken by each agent in the determination of the score in steps S212, S226 and S240 may be weighted according to at least one of the criticality of the respective function and the criticality of the operations provided by the function. That is to say, infrastructure resources are typically thought of as being more critical than others. Therefore, the weights applied in step S212 may be increased accordingly as those measurements are deemed to be more important in assessing the functionality of cloud services provider C.

This criteria may be applied to all of the agents being used in the monitoring of a cloud services provider C as this will ensure consistency in the measurements and eventual consistency in the output if a fault occurs. The weighting may be tweaked by the cloud services provider C or by another user of the method or system. That is to say, agents monitoring resources providing highly critical services and highly critical operations may be weighted higher than agents monitoring resources providing services of lower criticality.

For example, if the function provided by the infrastructure resource implements national telecommunications infrastructure functionality as part of, say, network virtualisation or some other telecommunications functionality, the criticality of the respective function provided by the cloud services provider C and the criticality of the operations provided by the cloud services provider C would be treated as high. This would mean the weighting given to the agents monitoring the resource would be determined accordingly. That is to say, measurements determined by internal agent 120 may be assigned a high weighting of say 0.8 (if it was located inside the infrastructure resource 102) but measurements determined by external agent 122 may be weighted at 0.9 as it is less likely to be compromised by the owners of the resource whilst still be close enough to be able to resist local network effects.

In FIG. 2c, the tracking of network resource 114 is illustrated as an example. That is to say, the measurement from internal agent 128 is fed into tracking module 136 having been assigned a weight ($W_I$) and the measurement from external agent 130 is fed into tracking module 136 having been assigned a weight ($W_E$).

The calculation of the success score for each resource enables the performance of each resource to be tracked and the score to be stored. Again, from FIG. 2c, we can see that the tracking module 136 enables the score to be tracked over time for a particular resource. The example in FIG. 2c is for the network resource 114 but it applies equally to a success score for resources of all types.

The steps S200 to S212 are repeated for each resource which delivers infrastructure services for the cloud provider and they each generate a success score which can be stored by system 100 using any suitable storage means.

The steps S214 to S226 are repeated for each resource which delivers application services for the cloud provider and they each also generate a success score which is stored by system 100 using any suitable storage means.

Similarly, steps S228 to S240 are repeated for each resource which delivers network services for the cloud provider and they also generate a success score which is stored by system 100 using any suitable storage means.

The success scores gathered in respect of infrastructure resources 102, 104 and 106 are then combined in a weighted combination in step S242 to give a score indicative of how successfully the cloud services provider provides infrastructure functionality. The weights are assigned based on the respective resource and the hardware and network configuration which is required to access that resource. The weights used for the infrastructure resources 102, 104 and 106 are denoted respectively as $W_{102}$, $W_{104}$ and $W_{106}$.

The success scores gathered in respect of application resources 108, 110 and 112 are then combined in a weighted combination in step S244 to give a score indicative of how successfully the cloud services provider provides application functionality. The weights are assigned based on the respective resource and the hardware and network configuration which is required to access that resource. The weights used for the application resources 108, 110 and 112 are denoted respectively as $W_{108}$, $W_{110}$ and $W_{112}$.

The success scores gathered in respect of network resources 114, 116 and 118 are then combined in a weighted combination in step S246 to give a score indicative of how successfully the cloud services provider provides network functionality. The weights are assigned based on the respective resource and the hardware and network configuration which is required to access that resource. The weights used for the network resources 114, 116 and 118 may be denoted respectively as $W_{114}$, $W_{116}$ and $W_{118}$.

Each agent monitoring a type of functionality provided by a cloud services provider C may be configured to collect the same measurement as the other agents monitoring the same type of functionality provided by the provider C. This ensures the same calculation/measurement of performance is used by each agent to monitor that type of functionality and therefore that calculations of the performance of that type of functionality cannot be undermined by a lack of consistency.

If a resource is known to provide unreliable results because it is, say, located in a particularly "noisy" part of the world then it will be assigned a lower weighting. By the same reasoning, a resource may be assigned a higher weighting if it is known to provide reliable measurements.

We describe above the use of internal and external agents which monitor the respective resource with checks on their functionality to track how well they are functioning. It is the use of these agents which enable system 100 to provide reliable, auditable and objective measurements of the functionality of each resource of the cloud service provider.

The internal agent and external agent corresponding to each resource are distinct agents. In using distinct agents to monitor each resource, a more reliable and objective measurement of the resources successful functionality can be determined. This is because the agents can be located in different places or one agent can be internal to the resource and one agent can be external to the resource.

If the agents are located in different places, then they will experience different levels of network obstacle in their communication with the resource and different levels of noise. That is to say, for an infrastructure providing server capacity that is located in San Francisco on the west coast of USA, an internal agent which is also located in San Francisco is likely to experience a higher degree of success in initiating server resources than an external agent which is located in Boston, Mass. on the East Coast. For this reason, the internal agent is given a higher weighting than the external agent.

In one instance, an agent can be located internally to the resource and another agent can be external to the resource. This would lead to the internally located resource being given a lower weighting as its score could be biased by the cloud service provider. The external agent can then be given a higher weighting as its measurements are likely to be more reliable.

In steps S242, S244 and S246, i.e. where the success scores of all of the resources providing the same type of functionality are combined, the weight applied to the success scores are again determined by how operationally significant the measurement is likely to be. The operational significance may be determined, as set out above, based on a myriad of different factors such as the criticality of the service, criticality of the operation, the physical location, the local conditions, historical reliability measurements and any other measurement deemed suitable for assessing the reliability of a measurement.

For example, in S242 where the success scores determined for infrastructure resources 102, 104 and 106 are combined to give a score indicative of the performance of the infrastructure resources, the score for infrastructure resource 102 may be considered to be more reliable because, for example, it has historically been a more reliable measure of the infrastructure resources offered by the cloud services provider C. This will mean that a higher weight will be assigned to the success score for infrastructure resource 102.

Alternatively or additionally, infrastructure resources 104 and 106 may be given lower weights because they both utilise internal agents which are located inside the resource which increases the likelihood that the respective success scores would be biased by the provider C who maintains those resources rather than the externally located internal agent 120 which is not biased by being positioned physically inside the resource 102.

Similar considerations will be given to the weights assigned to the success scores given to network resources and application resources when the combined scores are determined in steps S244 and S246.

We will now describe with reference to FIG. 3 how the overall functionality of cloud service provider C can be monitored using all of the information contributed from the measurement of infrastructure resources 102, 104 and 106, network resources 114, 116 and 118 and application resources 108, 110 and 112.

In a step S300, the scores determined in steps S242, S244 and S246 are received and gathered together in storage. The storage may be local, remote or located on storage facilities provided by another cloud service provider. The scores are then used to determine a score regarding the functionality of the cloud services provider C in step S302.

Step S304 is then executed to aggregate the scores determined in steps S242, S244 and S246. This is illustrated schematically in FIGS. 4a and 4b with an example where the system is only configured to monitor a single network resource 114 but monitor infrastructure resources 102, 104 and 106 and monitor application resources 108, 110 and 112. In other embodiments the system may monitor a plurality of network resources and only a single infrastructure resource or only a single application resource. In other embodiments the system may monitor many network, infrastructure and application resources.

If the score determined in step S242, i.e. the score in respect of the performance of the infrastructure resources 102, 104 and 106, is less than 0.5 then step S304 will output a score of 0 for entire cloud services provider C in a step S306. This indicates that the cloud services provider C is not functioning well at that instance in time. Alternatively, system 100 may be configured to output a warning of system failure if the score determined in any of steps S242, S244 and S246 is lower than an acceptance threshold which indicates the cloud provider is performing in an acceptable way.

That is to say, the infrastructure may be treated with higher priority by system 100 than other types of functionality when scoring the entire cloud services provider C. For example, there are instances where a network ping operation to establish connectivity and measure the performance of a network resource are successful, but infrastructure is not available and in this situation the service offered by provider C will fail irrespective of the performance of the other resources.

If the score determined in step S242 is more than or equal to 0.5 then step S304 will determine a weighted combination of the scores determined in steps S242, S244 and S246 and output this score in step S308. The weights assigned respectively to the network, infrastructure and application scores is denoted as $W_N$, $W_I$ and $W_A$.

The weights given to the scores can again be determined based on a large number of factors such as the reliability of the agents which monitor individual resources, knowledge about the successful functionality of the respective resources, the location of the respective agents.

The score which is determined in step S304 and output in respective step S306 or S308 can then be used to assess the functionality of cloud services provider C as it evolves in time. That is to say, the scores which are gathered can be used to build a reliable, objective and auditable way of assessing the functionality of cloud services provider C.

In FIG. 4b we can see this graphically, the network resource 114 associated with a cloud services provider C are scored, the infrastructure resources 102, 104 and 106 are also scored and the application resources 108, 110 and 112 are also scored. The scores from each resource are then combined (using corresponding weighting values $W_N$, $W_I$ and $W_A$) and fed into the step S304 where they are again combined, i.e. aggregated, using a corresponding weighting to provide a score for cloud services provider C. As is illustrated in FIG. 4b, the cloud service provider is assigned a score 0 during a time interval between 75 and 85 because the infrastructure resources were scoring lower than 0.5 around that instance in time, as illustrated in FIG. 4a.

The output from step S304 can then be used to determine the likelihood that the cloud service provider has failed at a specific time. That is to say, the failure occurs where the score drops to 0 but the system 100 is not limited by this. Indeed, the evolution of the score in time can be used to determine the overall functionality of the cloud services provider.

The storage of the scores determined in respect of the resources of the cloud services provider C can then be used to track where the failure is likely to have occurred. That is to say, the system 100 can implement a routine which can trace back through the scores determined at steps S212, S226, S240, S242, S244, S246 and S304 to determine the source of the failure.

The scores at each stage are stored and can respectively be indexed in time. This means that when a failure occurs the likely source of the failure can be isolated and identified as it is likely to have contributed a low score at the initial measurement stage by the agents. Additionally or alternatively, if the application resources are generally failing at that time, then they will all contribute a low score and this will also show when the routine traces back the scores at the respective instance in time the failure is identified to have taken place.

The effect of this is that the system 100 enables the functionality of the cloud services provider C to be monitored and failure points to be objectively and reliably identified. The storage of the measurements taken at each stage provides an auditable system which enables precise points of failure in the provider C to be identified.

For example, if the output from step S304 indicates the cloud service provider C has failed in a specific time interval, then the data which contributed to that score at every stage can be examined to identify the failing component—it may not necessarily be the infrastructure which has dragged the scoring down.

In one example, it may be the application resources 108, 110 and 112 which are failing, and the data gathered in step S244 would indicate this. From step S244, the system may be configured to traverse the stored data to identify the lowest scoring application resources. The lack of functionality of a specific application resource may be due to a need for maintenance or it may be due to something more sinister, such as a cyber-attack. The system 100 enables this to be identified in a reliable, auditable and objective manner which maintains the integrity of the resources provided by the cloud services provider.

System 100 may also be used to assess regional performance by using regional scoring.

To this end, system 100 may collect success scores from multiple regions to generate scores for each region. An example of a regional layout of resources is shown in the map in FIG. 5 which illustrates the geographical spread of the resources owned by cloud services provider C in terms of the regions (denoted with a square) and the Edge Locations (denoted with a circle).

System 100 may be configured to focus on the resources which are on the west-coast of the US, say, and the system will monitor the functionality of the infrastructure resources, application resources and network resources which are located on the west coast of the US, or even more particularly, in Northern California.

System 100 may, at the same time, be configured to focus on the resources which are located on the east coast or even, more specifically, in the Northern Virginia area. That is to say, the agents may be configured to focus on a specific geo-location, a specific zone and specific region.

The functionality of the cloud services provider C can be assessed on a region by region basis in that the resources located in Northern California can be compared to those in the Northern Virginia area. That is to say, the resources located in Northern California can be compared with the resources in Northern Virginia.

A geographic focus on resources may involve scoring the respective resources differently.

For example, external agents may be distributed across multiple regions and, for example, if the storage service (as an example of an infrastructure resource) on the east cost of United States (US), then read/write operations will be requested from all regions in the US including agents located in the east coast.

The aggregation of scores for a zone or region can be calculated based on the success rate of all services that reside in that zone or region. For example, if the score to be calculated is for US East regions then a composite score of all scores from services on the US east will be included in the calculations in the step S304 calculation.

The aggregation of the success scores for all vendors across all zones and regions covered by a cloud services provider will be based on the success scores from all of the different regions but the weights will be determined, say, by the ratio of internet traffic served by those regions. For example, the score from the US east coast could be given a weight of 0.3 if it is known that it serves 30% of internet traffic.

In summary, system 100 deploys agents which are both functionally and geographically distributed and they are used to monitor cloud providers. The system applies weights to the measurements of any particular agents and uses the weighted measurement to determine whether or not specific cloud provider services are impacted. These measurements are then used to assess the risk associated with a failure of the cloud service provider in a reliable, measurable, objective and auditable way. This would, for example, provides an audit trail which can be relied upon in assessing the performance of a provider C.

The system 100 deploys a distributed measurement infrastructure and a distributed measurement store able to be replicated across multiple cloud service providers as they may also be the source of the network measurement in the first place.

In deploying system 100, a system such as Microsoft Azure which operates 55 regional zones with 3 hardware and network infrastructure configurations per region, querying 3 different Azure services in each region would generate 3,025 measurements per measurement cycle. If this is monitored every 10 minutes then this would lead to 435,600 measurements per day, which would then be stored on a cross-cloud provider time-series measurement store to avoid errors resulting from outages in any centralised repository used by system 100.

This high volume of data enables measurement at the 59 s level, i.e. the system is available for 99.999% of the time. The system 100 also removes measurement error and provides an audit trail that would survive catastrophic outages to multiple cloud service providers as the failure can be traced back to a specific resource.

The agents deployed using system 100 can be configured to directly interact with resource they are monitoring but in doing so can monitor the condition of an entire cloud service provider C.

The distributed nature of system 100 which uses different regional, hardware and network configurations to provide for a large volume of data to be built to assess the performance of a cloud service provider. That is to say, each agent uses different regional, hardware and network configurations to provide a large volume of data which can be used to assess the performance of a cloud services provider C.

System 100 can ultimately be used to isolate the source of an outage and then tie it back to what could be a service provider or a provider of another service. The distributed nature of the measurements taken from the resources provided by cloud service provider C and reduces the potential for measurement error during this analysis by orders of magnitude.

System 100 enables providers of enterprise insurers, for example, to isolate and remove downtime failures that are not to do with a cloud service provider such as, for example, hardware failures, networking failures, regional internet traffic issues, DNS failures, localised site specific failures and measurement failures from an agent.

Additionally, the prevalence of cloud service providers means that it is likely that provider will be needed to determine whether the relevant provider is functional in the first place. System 100 removes this dependence on potentially biased results by providing an approach which utilises a distributed architecture which is not reliant on specific infrastructure or technology.

System 100 is highly scalable and can be easily scaled to accommodate more resources and more types of resources than those described above. This can be done as the resources can simply be plugged into the system 100 using, say, a function as a service (FaaS) architecture.

Whilst the agents described above are configured to monitor a single resource of a single functional type, the same agent may perform multiple checks across multiple resources. Agents are generally distributed across many locations to ensure accuracy of the data they are collecting, i.e. that the measurements are not influenced by local issues.

It should be noted that the above-mentioned embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of determining a likelihood of a fault in a service provided by a network provider which provides a plurality of types of network functionality using a plurality of network resources, the method comprising:
   for each network resource providing a designated type of functionality:
      assigning a plurality of agents to monitor the designated type of functionality, wherein each agent is configured to determine a measurement indicative of a performance of the type of functionality by the each network resource, wherein each measurement is assigned a weighting determined by an operational significance of the agent, and wherein the operational significance is determined according to a combination of a location of the each agent and an importance of a function provided by the resource monitored by a respective agent; and
      combining the measurement determined by each agent to determine a first performance score, wherein the first performance score is indicative of the performance of the type of functionality provided by a respective network resource;

for each type of functionality:
  combining the first performance score with a respective first performance score determined for each of an other network resources providing the designated type of functionality; and
  using the combination of the first performance scores to determine a second performance score, wherein the second performance score is indicative of the performance of the type of functionality provided by the network provider,
  wherein each of the second performance scores are used to determine a third performance score indicative of the performance of the network provider; and
  using the third performance score to indicate the likelihood of the fault in the service provided by the network provider.

2. A method according to claim 1, wherein the operational significance of the agent is at least one of:
  determined by the location of the agent; and
  is based on a geographic location.

3. A method according to claim 1, wherein the plurality of agents comprises an internal agent and an external agent, and
  wherein the internal agent is physically located at the network resource and the external agent is located remotely relative to the network resource.

4. A method according to claim 3, wherein the internal agent and external agent are independent of the network resource.

5. A method according to claim 1, wherein using the second performance scores to determine a third performance score indicative of the performance of the network provider comprises:
  determining a second performance score for a designated type of functionality;
  comparing the second performance score with a monitoring threshold for the designated type of functionality; and
  based on the comparison, outputting a third performance score indicative of the performance of the network provider.

6. A method according to claim 5, wherein the designated type of functionality is infrastructure.

7. A method according to claim 1, wherein the measurement indicative of the performance of the type of functionality by the resource is repeated after an expiry of a time interval.

8. A method according to claim 1, wherein at least one of following is satisfied:
  the network provider is a cloud service provider; and
  the plurality of types of functionality are selected from cloud network, cloud infrastructure and cloud service.

9. A method according to claim 1, wherein an agent of the plurality of agents and an other agent of the plurality of agents, monitoring a same functionality as the agent of the plurality of agents, are weighted differently.

10. A method according to claim 9, wherein the agent of the plurality of agents is physically located inside the network resource and the other agent of the plurality of agents is located remotely relative to the network resource.

11. A system configured to determine a likelihood of a fault in a service provided by a network provider which provides a plurality of types of network functionality using a plurality of network resources, the system comprising:
  a plurality of agents configured to monitor a designated type of functionality out of the plurality of types of network functionality, wherein each agent is configured to determine a measurement indicative of a performance of the type of functionality by a network resource, wherein each measurement is assigned a weighting determined by and operational significance of the agent, and wherein the operational significance is determined according to a combination of a location of the each agent and an importance of a function provided by the network resource monitored by a respective agent; and
  a resource tracker corresponding to each agent in the plurality of agents, the resource tracker configured to combine the measurement determined by each agent to determine a first performance score, wherein the first performance score is indicative of the performance of the type of functionality a the respective network resource,
  wherein the system is configured to, for each type of functionality, combine the first performance score with a respective first performance score determined for each of an other network resources providing the designated type of functionality, wherein each performance score is assigned a weighting determined by the operational significance of the type of functionality, and use the weighted combination of the first performance scores to determine a second performance score, wherein the second performance score is indicative of the performance of the type of functionality by the network provider, and
  wherein the system is further configured to use each of the second performance to determine a third performance score indicative of the performance of the network provider, and to use the third performance score to indicate the likelihood of fault in the service provided by the network provider.

12. A system according to claim 11, wherein the operational significance is at least one of:
  determined by the location of the agent; and
  is based on a geographic location.

13. A system according to claim 11, wherein the plurality of agents comprises an internal agent and an external agent, and
  wherein the internal agent is physically located at the network resource and the external agent is located remotely relative to the network resource.

14. A system according to claim 13, wherein the internal agent and external agent are independent of the network resource.

15. A system according to claim 11, wherein using the second performance scores to determine a third performance score indicative of the performance of the network provider comprises:
  determining a second performance score for a designated type of functionality;
  comparing the second performance score with a monitoring threshold for the designated type of functionality; and
  based on the comparison, outputting a third performance score indicative of the performance of the network provider.

16. A system according to claim 15, wherein the designated type of functionality is infrastructure.

17. A system according to claim 11, wherein the measurement indicative of the performance of the type of functionality by the resource is repeated after an expiry of a time interval.

18. A system according to claim 11, wherein at least one of following is satisfied:

the network provider is a cloud service provider; and
the plurality of types of functionality are selected from cloud network, cloud infrastructure and cloud service.

* * * * *